(12) United States Patent
Gupta et al.

(10) Patent No.: US 9,131,371 B2
(45) Date of Patent: Sep. 8, 2015

(54) METHOD AND APPARATUS FOR MANAGING A RANDOM ACCESS COMMUNICATION SYSTEM

(75) Inventors: Piyush Gupta, Piscataway, NJ (US); Aleksandr Stolyar, Basking Ridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2315 days.

(21) Appl. No.: 11/241,684

(22) Filed: Sep. 30, 2005

(65) Prior Publication Data

US 2007/0076631 A1    Apr. 5, 2007

(51) Int. Cl.
*H04W 16/06*    (2009.01)
*H04W 16/04*    (2009.01)

(52) U.S. Cl.
CPC .............. *H04W 16/06* (2013.01); *H04W 16/04* (2013.01)

(58) Field of Classification Search
CPC .......... H04W 74/08–74/0833; H04W 28/046; H04W 28/048
USPC .................. 370/252, 328, 445, 447, 462, 345
See application file for complete search history.

(56) References Cited

U.S. PATENT DOCUMENTS

| | | | |
|---|---|---|---|
| 5,353,287 A | 10/1994 | Kuddes et al. | |
| 5,742,592 A | 4/1998 | Scholefield et al. | |
| 6,078,568 A * | 6/2000 | Wright et al. | 370/312 |
| 6,590,890 B1 | 7/2003 | Stolyar et al. | |
| 6,678,252 B1 * | 1/2004 | Cansever | 370/253 |
| 6,990,087 B2 * | 1/2006 | Rao et al. | 370/330 |
| 7,127,519 B2 * | 10/2006 | Li | 709/230 |
| 2002/0041578 A1 * | 4/2002 | Kim et al. | 370/335 |
| 2002/0142721 A1 * | 10/2002 | Souissi et al. | 455/41 |
| 2002/0181395 A1 * | 12/2002 | Foster et al. | 370/229 |
| 2003/0152041 A1 * | 8/2003 | Herrmann et al. | 370/310 |
| 2004/0043782 A1 | 3/2004 | Gupta | |
| 2005/0002364 A1 | 1/2005 | Ozer et al. | |
| 2005/0007997 A1 * | 1/2005 | Morton et al. | 370/351 |
| 2005/0058151 A1 * | 3/2005 | Yeh | 370/445 |
| 2005/0068922 A1 * | 3/2005 | Jalali | 370/335 |
| 2005/0157676 A1 * | 7/2005 | Kwak et al. | 370/328 |
| 2005/0272423 A1 * | 12/2005 | Stephens et al. | 455/434 |
| 2005/0286477 A1 | 12/2005 | Gupta et al. | |
| 2006/0056382 A1 * | 3/2006 | Yamada et al. | 370/349 |
| 2006/0211441 A1 * | 9/2006 | Mese et al. | 455/522 |
| 2006/0264229 A1 * | 11/2006 | Guo et al. | 455/522 |

(Continued)

OTHER PUBLICATIONS

Alexander L. Stolyar, Maximizing Queueing Network Utility Subject to Stability: Greedy Primal-Dual Algorithm, 2005 Springer Science + Business Media, Inc. Manufactured in the Netherlands, Queueing Systems, 50, 401-457, 2005.

(Continued)

*Primary Examiner* — Jeffrey M Rutkowski
*Assistant Examiner* — Kenan Cehic
(74) *Attorney, Agent, or Firm* — Fletcher Yoder PC

(57) ABSTRACT

There is provided a method and apparatus for managing a random access communication system. More specifically, there is provided calculating a first value representative of a transmission success rate between first and second wireless nodes, wherein the transmissions from the first node create interference at a third node, calculating a second value representative of a transmission success rate for transmissions between one or more other nodes and the third node, and setting an access attempt percentage for the first node based on the first value and the second value.

3 Claims, 3 Drawing Sheets

(56) References Cited

U.S. PATENT DOCUMENTS

| | | | | |
|---|---|---|---|---|
| 2006/0268792 | A1* | 11/2006 | Belcea | 370/338 |
| 2007/0064721 | A1* | 3/2007 | Garcia-Luna-Aceves | 370/445 |
| 2007/0110000 | A1* | 5/2007 | Abedi | 370/332 |
| 2007/0263657 | A1* | 11/2007 | Sugar et al. | 370/465 |
| 2008/0009306 | A1* | 1/2008 | Suga et al. | 455/522 |
| 2008/0137577 | A1* | 6/2008 | Habetha | 370/311 |
| 2008/0175149 | A1* | 7/2008 | Andrews et al. | 370/235 |

OTHER PUBLICATIONS

Alexander L. Stolyar, On the Asymptotic Optimality of the Gradient Scheduling Algorithm for Multiuser Throughput Allocation, Operations Research, vol. 53, No. 1, Jan.-Feb. 2005, pp. 12-25.

Alexander L. Stolyar, Maxweight Scheduling in a Generalized Switch: State Space Collapse and Workload Minimization in Heavy Traffic, The Annals of Applied Probability, 2004, vol. 14, No. 1, 1-53, Institute of Mathematical Statictics, 2004.

James L. Massey and Peter Mathys, The Collision Channel Without Feedback, IEEE Transactions on Information Theory, vol. IT-31, No. 2, Mar. 1985.

Karel A. Post, Convexity of the Nonachievable Rate Region for the Collision Channel Without Feedback, IEEE Transactions on Information Theory, vol. IT-31, No. 2, Mar. 1985.

Piyush Gupta and Alexander L. Stolyar, Throughput Region of Random Access Networks of General Topology, Mar. 10, 2005.

Tobagi et al., "Packet Switching in Radio Channels: Part II—The Hidden Terminal Problem in Carrier Sense Multiple-Access and the Busy-Tone Solution," IEEE Trans. Commun., Dec. 1975, pp. 1417-1733, vol. 23, No. 12.

Tsybakov et al., "Ergodicity of Slotted ALOHA System," Probl. Inform. Transmission, Mar. 1979, pp. 73-87, vol. 15.

Saadawi et al., "Analysis, Stability, and Optimization of Slotted ALOHA with a Finite Number of Buffered Users," IEEE Trans. Automatic Contr., Jun. 1981, pp. 680-689, vol. AC-26, No. 3.

Hajek et al., "Decentralized Dynamic Control of a Multiaccess Broadcast Channel," IEEE Trans. Automatic Contr., 1982, pp. 559-569, vol. AC-27, No. 3.

Gallager, "A Perspective on Multiaccess Channels," IEEE Trans. Inform. Theory, Mar. 1985, pp. 124-142, fol. IT-31, No. 2.

Tsybakov, "Survey of USSR Contributions to Random Multiple-Access Communications," IEEE Trans. Inform. Theory, Mar. 1985, pp. 143-165, vol. IT-31, No. 2.

Ghez et al., "Stability Properties of Slotted ALOHA with Multipacket Reception Capability," IEEE Trans. Automatic Contr., 1988, pp. 640-649, vol. AC-33, No. 7.

Sharma, "Stability and Continuity of Slotted ALOHA with Stationary Non-Independent Input Traffic," J. Appl. Probab., 1988, pp. 797-807, vol. 25.

Ghez et al., "Optimal Decentralized Control in the Random Access Multipacket Channel," IEEE Trans. Automatic Contr., 1989, pp. 1153-1163, vol. AC-34, No. 11.

Karn "MACA—A New Channel Access Method for Packet Radio," Amateur Radio 9th Computer Networking Conf., 1990, pp. 134-140.

Anantharam, "The Stability Region of the Finite-User Slotted ALOHA Protocol," IEEE Trans. Inform. Theory, May 1991, pp. 535-540, vol. 37, No. 3.

Parekh et al., "A Generalized Processor Sharing Approach to Flow Control in Integrated Services Networks: The Single-Node Case," IEEE/ACM Trans. Networking, Jun. 1993, pp. 344-357, vol. 1, No. 3.

Bharghavan et al., "MACAW: A Medium Access Protocol for Wireless LANs," in Proc. ACM SIGCOMM '94, Aug. 1994, 14 pages.

Deng et al., "Dual Busy Tone Multiple Access (DBTMA): A New Medium Access Control for Packet Radio Networks," Proc. IEEE ICUPC Conf., Oct. 1998, Florence, Italy.

Bianchi, "Performance Analysis of the IEEE 802.11 Distributed Coordination Function," IEEE J. Selected Areas Comm., Mar. 2000, pp. 535-547, vol. 18, No. 3.

Gupta et al., "The Capacity of Wireless Networks," IEEE Trans. Inform. Theory, Mar. 2000, pp. 308-404, col. IT-46, No. 2.

Sant et al., "Performance Analysis of a Slotted-ALOHA Protocol on a Caputure Channel with Fading," Queueing Systems, 2000, pp. 1-35, vol. 34.

Andrews et al., "Providing Quality of Service Over a Shared Wireless Link," IEEE Commun. Mag., Feb. 2001, pp. 150-154, vol. 39, No. 2.

Shakkottai et al., "Scheduling Algorithms for a Mixture of Real-Time and Non-Real-Time Data in HDR," Proc. 17th Intl. Teletraffic Congress—ITC-17, Sep. 2001, pp. 793-804, Salvador da Bahia, Brazil.

Rozovsky et al., "SEEDEX: A MAC Protocol for Ad Hoc Networks," Proc. ACM MobiHoc'01, Oct. 2001, pp. 67-75, Long Beach, CA.

Veres et al., "Supporting Service Differentiation in Wireless Packet Networks Using Distributed Control," IEEE Jour. Sel. Areas Commun., Oct. 2001, pp. 2081-2093, vol. 19, No. 10.

Akyildiz et al., "A Survey on Sensor Networks," IEEE Commun. Mag., Aug. 2002, pp. 102-114, vol. 40, No. 8.

Baccelli et al., "An Aloha Protocol for Multihop Mobile Wireless Networks," Proc. 41st Annual Allerton Con. On Commun., Control, and Computation, Oct. 2003, pp. 1655-1664, Monticello, IL.

Naware et al., "Stability of Slotted ALOHA with Spatial Diversity," IEEE Trans. Inform. Theory, Nov. 2003, pp. 463-467.

Mergen et al., "Random Scheduling Medium Access for Wireless Ad Hoc Networks," Proc. MILCOM'02, Oct. 2002, pp. 868-872, Anaheim, CA.

Frank Kelly, "Mathematical modeling of the Internet" (An extented version of a paper from th eProceedings of the Fourth International Congress on Industrial and Applied Mathematics); Statistical Laboratory, Centre for Mathematical Sciences, University of Cambridge; Jul. 1999; Wiberforce Road, Cambridge CB3 0WB, U.K.

Xin Wang and Koushik Kar, "Distributed Algorithms for Max-Min Fair Rate Allocation in ALOHA NEtworks"; 42nd Annual Allerton Conference on Communication, Control, and Computing 2006; Sep. 29-Oct. 1, 2004; Monticello, Illinois.

Koushik Kar, Saswati Sarkar, Leandros Tassiulas, "Achieving Proportional Fairness using Local Informaiton in Aloha Networks"; IEEE Transactions on Automatic Control; Oct. 2004; pp. 1858-1863; vol. 49, Issue 10.

Matthew Andrews, Lijun Qian, Alexander Stolyar, "Optimal Utility Based Multi-User Throughput Allocation Subject to Throughput Constraints"; INFOCOM 2005; 24th Annual Joint Conference of the IEEE Computer and Communications Societies; Mar. 13-17, 2005; vol. 4; pp. 2415-2424.

Piyush Gupta, Yogesh Sankarasubramaniam, Alexander Stolyar, "Random-Access Scheduling with Service Differentiation in Wireless Networks"; INFOCOM 2005; 24th Annual Joint Conference of the IEEE Computer and Communications Societies; Mar. 13-17, 2005; vol. 3; pp. 1815-1825.

* cited by examiner

METHOD AND APPARATUS FOR MANAGING A RANDOM ACCESS COMMUNICATION SYSTEM

BACKGROUND

1. Field of the Invention

This invention relates to a method and apparatus for managing accesses to a shared, randomly accessed communications channel.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

Recently, the popularity of wireless local area networks ("WLANs"), such as Wi-Fi and WiMAX networks, has surged. WLANs now provide data connectivity in places such as offices, homes, campuses, and supermarkets. Moreover, WLANs are also becoming an integral part of many next-generation communication networks, such as 3G networks. A WLAN typically operates without completely centralized control of accesses to a shared wireless channel, which is typically referred to as distributed scheduling or random access scheduling. In random access scheduling, the nodes (wireless telephones or computers, for example) of a local contention neighborhood compete for access to the shared channel. More specifically, the individual nodes determine for themselves when and if to attempt to access the channel. As such, two or more nodes may attempt to transmit to the channel at the same time. When this happens, the transmissions may interfere with each other, or collide, which can jumble one or both transmissions, and prevent a receiver (a WLAN access point, for example) from determining the complete context of either transmission. Consequently, the failed transmissions typically have to be resent, which effectively reduces the available bandwidth of the shared wireless channel. For example, if two nodes within a local contention neighborhood are each attempting to communicate with a third node (an access point, for example) ninety-five percent of the time (i.e., each of the nodes has an access attempt percentage of ninety-five percent), ninety percent or more of the potential bandwidth of the wireless channel could be lost to collisions, because at the least both nodes will be transmitting ninety percent of the time. In other words, since each node is transmitting all of but five percent of the time, the largest amount of time that one, but not both, of the nodes could be transmitting is ten percent, which could then lead to collisions the other ninety percent of the time. Alternatively, if the two nodes are only attempting to transmit to the access point five percent of the time (an access attempt percentage of five percent), collisions are unlikely, but the only ten percent (at most) of the possible capacity of the wireless channel will be utilized.

For this reason, one of the challenges in designing and operating a random access wireless network is managing the access attempt percentages for the nodes in the WLAN. If the nodes are instructed to keep their access attempt percentages low, collisions are unlikely but bandwidth is low. Whereas if the nodes are permitted to increase their access attempt percentages at will, the number of collisions can escalate and the available bandwidth of the wireless channel can be negatively affected. Further complicating the assignment of access attempt percentages in a WLAN is the fact that two nodes in communication with different access points can also interfere with one another and cause collisions. Thus, it would be desirable to be able to manage the communication of multiple independent nodes with one or more other nodes or access points such that the shared wireless channel is more efficiently utilized.

SUMMARY

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

There is provided a method and apparatus for managing a random access communication system. More specifically, there is provided a method comprising calculating a first value representative of a transmission success rate between first and second wireless nodes, wherein the transmissions from the first node creates interference at a third node, calculating a second value representative of a transmission success rate of transmissions between one or more other nodes and the third node, and calculating an access attempt percentage based on the first value and the second value.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments described below may be directed towards an apparatus or a method for managing a distributed, random access wireless communication system. More specifically, one or more of the embodiments described herein are directed towards wireless nodes that are configured to adjust their access attempt percentages for one or more access points based on an indicia of the inter-node interference generated such that the bandwidth over the wireless channel between the nodes and the access points increases while reducing or minimizing the number of collisions at the access points.

Figure 1:
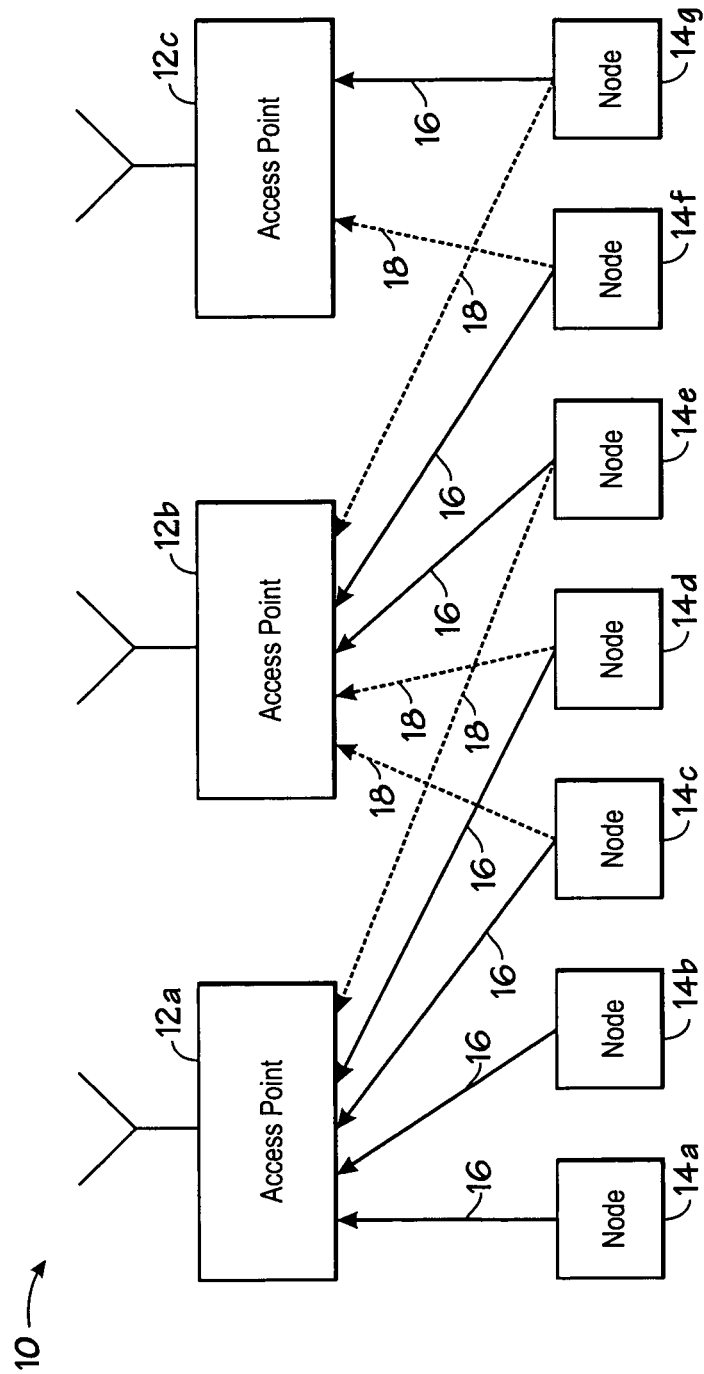
FIG. 1 illustrates an exemplary local contention neighborhood of a wireless data network in accordance with one embodiment.

Turning now to FIG. 1, an exemplary local contention neighborhood of a wireless data network ("WDN") in accordance with one embodiment is illustrated and generally designated by a reference numeral 10. In various embodiments, the WDN may include a wireless local area network ("WLAN"), an ad hoc wireless network, a wireless sensor network, and so forth. As illustrated in FIG. 1, the neighborhood 10 may include a plurality of access points 12a, 12b, and 12c and a plurality of nodes 14a, 14b, 14c, 14d, 14e, 14f, and 14g (hereafter referred to as "14a-g"). The access points 12a, 12b, and 12c may be any form of wireless access point suitable for communicating with the nodes 14a-g and/or relaying information or data amongst the nodes 14a-g or between the nodes 14a-g and other networks, such as the Internet, a telephone network, and the like. In various embodiments, the access points 12a, 12b, and 12c may be WLAN access points, 802.11 access points, 802.16 ("WiMAX") access points, third generation ("3G") wireless base stations, and so forth. It will be appreciated that the above-described examples of the access points 12a, 12b, and 12c are not intended to be exclusive.

Similarly, the nodes 14a-g may be any form of computer, telephone, or other electronic device that can communicate with the access points 12a, 12b, and 12c across the wireless channel. Examples of suitable nodes 14a-g include, but are not limited to, personal computers, laptops, personal digital assistants ("PDAs"), cellular telephones, wireless transceivers, wireless interface cards, such as a PCI or PCMCIA card, and so forth.

As illustrated in FIG. 1, the nodes 14a-g may transmit signals that are received by the access points 12a, 12b, or 12c. The communications between the nodes 14a-g and the access points 12a, 12b, or 12c may take one of two forms: either data connection 16 or interference effects 18. The data connections 16 illustrated in FIG. 1 represent transmissions from one of the nodes 14a-g that are intended for one of the access points 12a, 12b, or 12c. For example, the node 14a may have a data connection 16 with the access point 12a over which the node 14a may attempt to send a transmission, such as an e-mail message or a web page request.

However, as illustrated in FIG. 1, the nodes 14a-g may also produce interference effects 18 that interfere with transmissions to the access points 12a, 12b, and 12c. As those of ordinary skill in the art will appreciate, when one of the nodes 14a-g attempts to transmit to one of the access points 12a, 12b, or 12c over one of the data connections 16, the electromagnetic wave carrying the transmission can radiate outwardly from the node 14a-g to other places besides the intended access point 12a, 12b, or 12c. If the transmitted electromagnetic wave reaches another access point 12a, 12b, or 12c besides the intended access point, the electromagnetic wave can collide with other transmissions intended for the other access point. This collision can cause noise and interference on both transmissions, and, thus reduce the available bandwidth at the other access point 12a, 12b, or 12c. For example, although the node 14c may be attempting to communicate with the access point 12a, the electromagnetic wave generated by the node 14c (i.e., the transmission) may also be received by the access point 12b. Even though the node 14c did not intend to communicate with the access point 12b, the errant communication (illustrated as the interference effect 18) can still produce collisions at the access point 12b. Moreover, the signals transmitted from the nodes 14a-g to one of the access points 12a, 12b, or 12c over the data connections 16 can also interfere with each other. For example, as described above, if both the node 14a and 14b are transmitting to the access point 12a, the electromagnetic waves generated by the nodes 12a and 12b can interfere with each other and cause collisions. As such, efficiently managing the shared wireless channel in the local contention neighborhood 10 involves managing both the nodes 14a-g intending to communicate with a particular one of the access points 12a, 12b, or 12c, and the nodes 14a-g that are potentially interfering with that access point.

Figure 2:
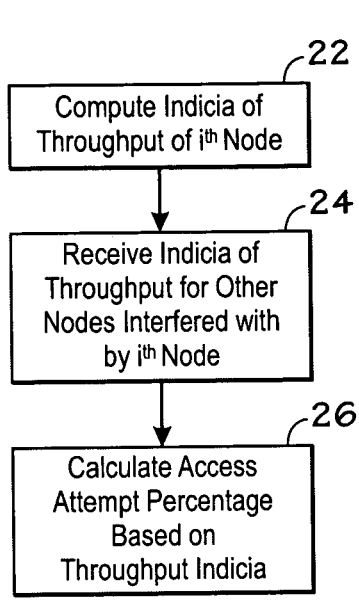
FIG. 2 is a flow chart illustrating an exemplary technique for computing an access attempt percentage in accordance with one embodiment.

As described above, it is desirable to manage how often the nodes 14a-g attempt to access the access points 12a-c such that the bandwidth of the wireless channel is improved and/or maximized. One technique for measuring how often the nodes 14a-g attempt to access the access point 12a-c is with an access attempt percentage that reflects what percentage of time a particular node 14a-g is attempting to access one of the access points 12a-c (i.e., how often the node is transmitting). In other words, it is desirable to be able to program each of the nodes 12a-12f to be able to adjust their access attempt percentages for each of the access points 12a, 12b, or 12c such that the bandwidth over the shared wireless channel is efficiently managed while maintaining an access attempt percentage across the neighborhood 10 such that the number of collisions at each of the access points 12a, 12b, and 12c is reduced and/or minimized compared to conventional systems. Moreover, it is also advantageous to be able to manage the access attempt percentages for the nodes 14a-g such that each of the nodes 14a-g is assured a certain minimum throughput (if possible). Accordingly, FIG. 2 is a flowchart illustrating an exemplary technique 20 for computing and setting an access attempt percentage in accordance with one embodiment. The technique 20 may be performed by one or more of the nodes 14a-g.

One advantage of the technique 20, as described below, is that it enables the nodes 14a-g to select access attempt percentages in view of the potential interference that the other nodes 14a-g have on each other. For example, in a conventional system, if the node 14c was having difficulty communicating with the access point 12a, it might have begun to boost its access attempt percentage in an attempt to communicate more successfully with the access point 12a. As described above, however, this boost in access attempt percentage can adversely affect the other nodes (i.e., the node 14e and the node 14f) communicating with the access point 12b by increasing the number of collisions at the access point 12b. Eventually, if the access attempt percentage of the node 14c grows high enough, the harm to the nodes 14e and 14f (as well as nodes 14a and 14b) may overshadow the benefit to the node 14c. Moreover, a "competition" between multiple nodes 14a-g may lead to degradation of useful throughput on multiple or all data communication links in the neighborhood 10. The technique 20 serves to mitigate these collisions by basing the access attempt percentage of one node on one or more indicia of inter-node interference, such as throughput, transmission success rate, and the like. Changes in access attempt percentage for a particular node are linked to the inter-node interference created by the individual node. As such, even though a particular one of the nodes 14a-g may wish to boost its access attempt percentage to increase its transmission success rate, the degree of any increase in access attempt percentage may be limited by the transmission success rate of other nodes 14a-g affected by the particular node. Accordingly, the technique 20 (and the technique 30 discussed below) provides a fair, distributed technique for calculating access attempt percentages in the neighborhood 10.

As illustrated in block 22 of FIG. 2, the technique 20 may begin with one or more of the nodes, 14a for example (hereafter referred to as the "$i^{th}$ node"), computing an indicia of the throughput of the $i^{th}$ node, which reflects successful data transmissions by the $i^{th}$ node to one of the access points 12a-c. In one embodiment, computing the indicia of throughput involves determining a weighted value, referred to as a dynamic weight, based at least partially on whether the last transmission from the $i^{th}$ node to one of the access point 12a, 12b, or 12c was a success. In alternate embodiments, other indicia of the node throughput may be employed.

Next, the technique 20 may involve receiving one or more indicia of the throughput for other nodes interfered with by the $i^{th}$ node, as indicated by block 24. For example, if the node 14c in FIG. 1 may interfere with the nodes 14a, 14b, and 14d, the $i^{th}$ node may receive dynamic weights based on transmission success rates for the nodes 14a, 14b, and 14d. In one embodiment, each $j^{th}$ node interfered with by the $i^{th}$ node may be configured to "piggyback" the indicia of throughput onto other signals transmitted by the $j^{th}$ node. In other words, the nodes interfered with by the $i^{th}$ node may transmit the indicia of their throughput along with the other transmissions from these nodes. The $i^{th}$ node may then either receive the transmission containing the indicia of throughputs directly from the interfered with nodes or may receive the indicia from an intermediate source, such as one of the access points 12a, 12b, or 12c, which is configured to retransmit the indicia.

As indicated by block 26 in FIG. 2, the technique 20 may also involve calculating an access attempt percentage for the $i^{th}$ node based on the indicia of throughputs discussed above. Because the $i^{th}$ node calculates its access attempt percentage based on both indicia of its own throughput and the indicia of the throughput of other nodes with which the $i^{th}$ node may interfere, the access attempt percentage calculated using the technique 20 can account for inter-node interference where conventional system could not.

Figure 3:
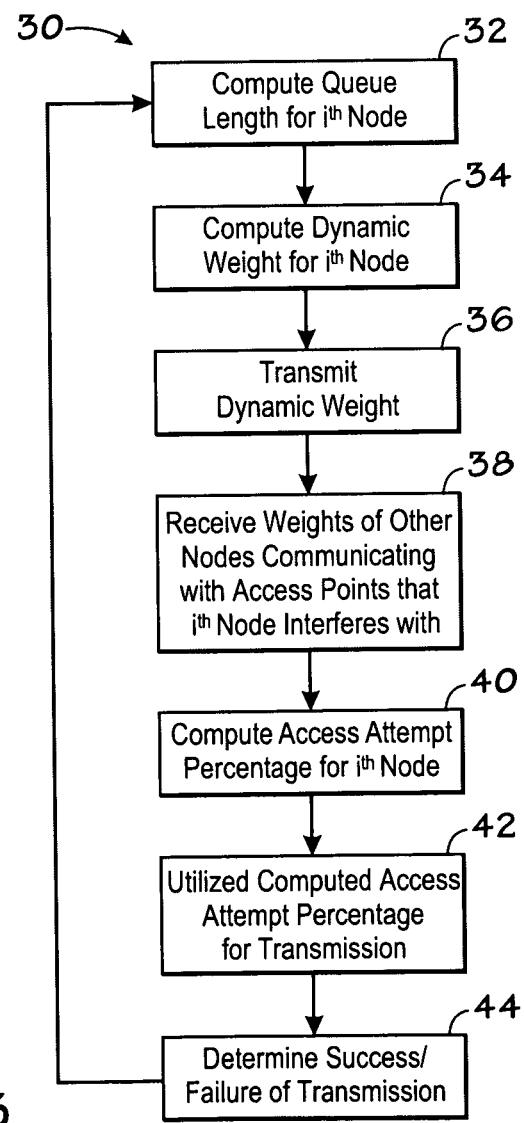
FIG. 3 is a flow chart illustrating another exemplary technique for computing an access attempt percentage in accordance with one embodiment.

As described above, the nodes 14a-g illustrated in FIG. 1 may be configured to calculate access attempt percentages based on one or more indicia of throughput. For example, in one embodiment, the nodes 14a-g may be configured to calculate access attempt percentages based on the dynamic weight, which is a weighted value based on the transmission success or failure between the nodes 14a-g and the access points 12a, 12b, and 12c. Accordingly, FIG. 3 is a flowchart illustrating another exemplary technique 30 for computing and setting an access attempt percentage in accordance with one embodiment. As with the technique 20, the technique 30 may also be performed by one or more of the nodes 14a-g. The technique 30 may begin with the $i^{th}$ node computing a mathematical value, known as a queue length, representative of the throughput between the $i^{th}$ node and its corresponding access point. In one embodiment, the queue length is the actual number of transmissions awaiting transmission from the $i^{th}$ node. In another embodiment, which is described below, the queue length is a mathematical value representative of a transmission success rate for the $i^{th}$ node. In this embodiment, the queue length decreases when the $i^{th}$ node makes successful transmissions and increases when the $i^{th}$ nodes interfered with by the $i^{th}$ node's transmissions are not successful. In one embodiment, with a desired minimum throughput of at least c data packets per slot, the queue length for a future time period, t+1 may be computed using the following equation, where t is one slot:

$$q_i(t+1)=[q_i(t)+c-s_i(t)]^+ \quad \text{(Equation 1)}$$

where $q_i$ is queue length (which is equal to zero at t=0), c is the desired minimum throughput, $s_i$ is equal to one if the previous transmission was a success and to zero if the previous transmission from the $i^{th}$ node was not a success or there was no previous transmission, and the superscript "+" indicates that the value of $q_i(t+1)$ is held at a value greater than or equal to zero (in other words, if $q_i(t+1)$ is negative mathematically, it is artificially set to zero). In other words, $q_i(t+1)$ is the maximum of "0" and $[q_i(t)+c-s_i(t)]$. If most transmissions are successful, $s_i$ will often be equal to one, and the value of $q_i$ will remain close to zero. If, however, many transmissions are unsuccessful, $s_i$ will most often be equal to zero and the value of the queue length will grow by c with each iteration. In alternate embodiments, the queue length may be calculated at different intervals. For example, in various alternate embodiments, the queue length may be recalculated after every time slot, after every four time slots, or after every second. Moreover, in a more general embodiment where the queue length is recalculated after every N time slots, Equation 1 can be replaced with the following equation:

$$q_i(t+N)=[q_i(t)+N^*c-s_i(t+1,t+N)]^+ \quad \text{(Equation 2)}$$

where $s_i(t+1,t+N)$ is equal to the total number of successful transmissions by the $i^{th}$ node in slots t+1, . . . ,t+N.

Although the queue length itself is an indicia of throughput, the queue length can rapidly fluctuate. For this reason, in some embodiments, the indicia of throughput may be based on a dynamic weight, $w_i$, which equal to the queue length dampened by a dampening factor (block 34). In one embodiment, the $i^{th}$ node may compute its dynamic weight using the following equation:

$$w_i(t)=1+\beta q_i(t) \quad \text{(Equation 3)}$$

where β is a dampening coefficient between 1 and 0.001 and $q_i$ is the queue length previously computed in block 32. For example, in one embodiment, the dampening coefficient β is 0.01. Once the $i^{th}$ node has computed its dynamic weight, it may transmit the computed dynamic weight to other nodes 14a-g and/or the access points 12a, 12b, or 12c, as indicated in block 36. As discussed above, in one embodiment, the nodes 14a-g are configured to "piggyback" their current dynamic weights along with other transmissions to the access points 12a, 12b, and 12c or to other nodes 14a-g.

As described above, the node 12a-g may be configured to transmit their dynamic weights to one or more of the other nodes 14a-g and/or the access points 12a, 12b, or 12c, so that the nodes can perform the technique 30. As such, the technique 30 may also involve the $i^{th}$ node receiving the dynamic weights of the other nodes 14a-g that are communicating with access points that the $i^{th}$ node interferes with, as indicated by block 38. For example, looking to FIG. 1, the node 14c interferes with the access point 12b. As such, the node 14c may receive the dynamic weights for the node 14e and the node 14f, because the nodes 14e and 14f are communicating with the access point 12b that receives interference from the node 14c. Further, if the node 14c were also interfering with the access point 12c (contrary to what is illustrated in FIG. 1), the node 14c may also receive the dynamic weight of the node 14g. In various embodiments, the $i^{th}$ node may receive the dynamic weights of the other nodes 14a-g communicating with access points that the $i^{th}$ node interferes with from either the other nodes 14a-g themselves or from one of the access points 12a, 12b, or 12c.

The $i^{th}$ node may utilize its own dynamic weight and the dynamic weight of one or more of the other nodes 14a-g communicating with the access points 12a, 12b, and 12c that the $i^{th}$ node interferes with to compute an access attempt percentage, as indicated in block 40. In one embodiment, the $i^{th}$ node may compute its access attempt percentage using the following equation:

$$p_i(t) = \frac{w_i(t)}{\sum w_j(t)} \qquad \text{(Equation 4)}$$

where $p_i$ is the access attempt percentage, $w_i$ is the dynamic weight for the $i^{th}$ node, and $\Sigma w_j$ is the sum of the dynamic weights of each of those nodes j out of 14a-g which communicate with access points 12a, 12b, or 12c that the $i^{th}$ node interferes with. As such, $\Sigma w_j$ also includes the weight $w_i$ itself. For example, if the $i^{th}$ node has a relatively high transmission success rate (and thus a lower dynamic weight) and the nodes with which the $i^{th}$ node interferes have a relatively low transmission success rate (and thus a higher dynamic weight), the access attempt percentage for the $i^{th}$ node will be lower to reduce the inter-node interference. Whereas, if the $i^{th}$ node has a relatively low transmission success rate (and thus a higher dynamic weight) and the nodes with which the $i^{th}$ node interferes have a relatively higher transmission success rate (and thus a lower dynamic weight), the access attempt percentage for the $i^{th}$ node may be higher, because inter-node interfere generated by the $i^{th}$ node may be acceptable.

Once the $i^{th}$ node has computed an access attempt percentage, it may utilize the computed access attempt percentage for communications with one of the access points 12a, 12b, or 12c. For example, if the computed access attempt percentage is fifty percent, the $i^{th}$ node will attempt to transmit to its access point for approximately half of each time period t. As such, if the time period t is two time slots long, the $i^{th}$ node may attempt to transmit for the entire first time slot and not transmit for the entire second time slot or may periodically transmit during the two slot time period for a time totaling one time slot. Moreover, while the $i^{th}$ node is transmitting, it may continue to piggyback its current dynamic weight on its transmissions so that other nodes 14a-g may utilize the $i^{th}$ node's dynamic weight to compute their own access attempt percentages.

After the time period has elapsed, the $i^{th}$ node may determine whether the transmission utilizing the computed access attempt percentage was successful or unsuccessful as indicated in block 44. If the transmission attempt was successful, $s_i$ (described above) is set to one; whereas if the transmission was unsuccessful, $s_i$ is set to zero. Lastly, the technique 30 cycles back to block 32, as indicated in FIG. 2 where the newly set $s_i$ values are employed, as described above.

An additional advantage of the technique 30 is that the nodes 14a-g may also be configured to support a minimum throughput if the condition of the wireless channel supports the minimum throughput. As described above, Equation 1 includes the value c, which represents a minimum desired throughput of a node 14a-g. It will be appreciated that the minimum throughput c may or may not be different for different nodes 14a-g. If this minimum throughput value is set to a relatively low level, 0.01 for example, c may have relatively little effect of the queue length and consequently little effect on the dynamic weight of nodes. If, however, the value of c is increased to a higher level, 0.08 for example, c may have more impact on the queue length equation (Equation 1) and thus more impact on the calculation of the dynamic weight of the each of the nodes 14a-g. For example, if c=0.08 and node 14g is experiencing many collisions on its transmissions, $s_i$ in Equation 1 will mostly be zero and c will be a constant 0.08. Thus, in time, the value of the queue length, $q_i$, will grow as will the value of the dynamic weight, $w_i$, (dampened by the value of β). Because the access attempt percentage (Equation 3) is a function of the dynamic weight for one node in relation to the dynamic weight of the other nodes 14a-g, eventually the increase in the dynamic weight of node 14g will reduce the access attempt percentage of node 14f, which is interfering with communication of node 14g (assuming that node 14f is not also having trouble communicating). As the access attempt percentage of node 14f decreases the interference generated by node 14f at access point 12c will decrease, permitting the node 14g to complete for transmissions due to the lower number of collisions. This process will continue until the throughput "c" of node 14g reaches a steady state around 0.08. As such, the technique 30 described above enables minimum throughput levels to be achieved in a distributed access system assuming that the channel conditions support the throughput level.

Figure 4:
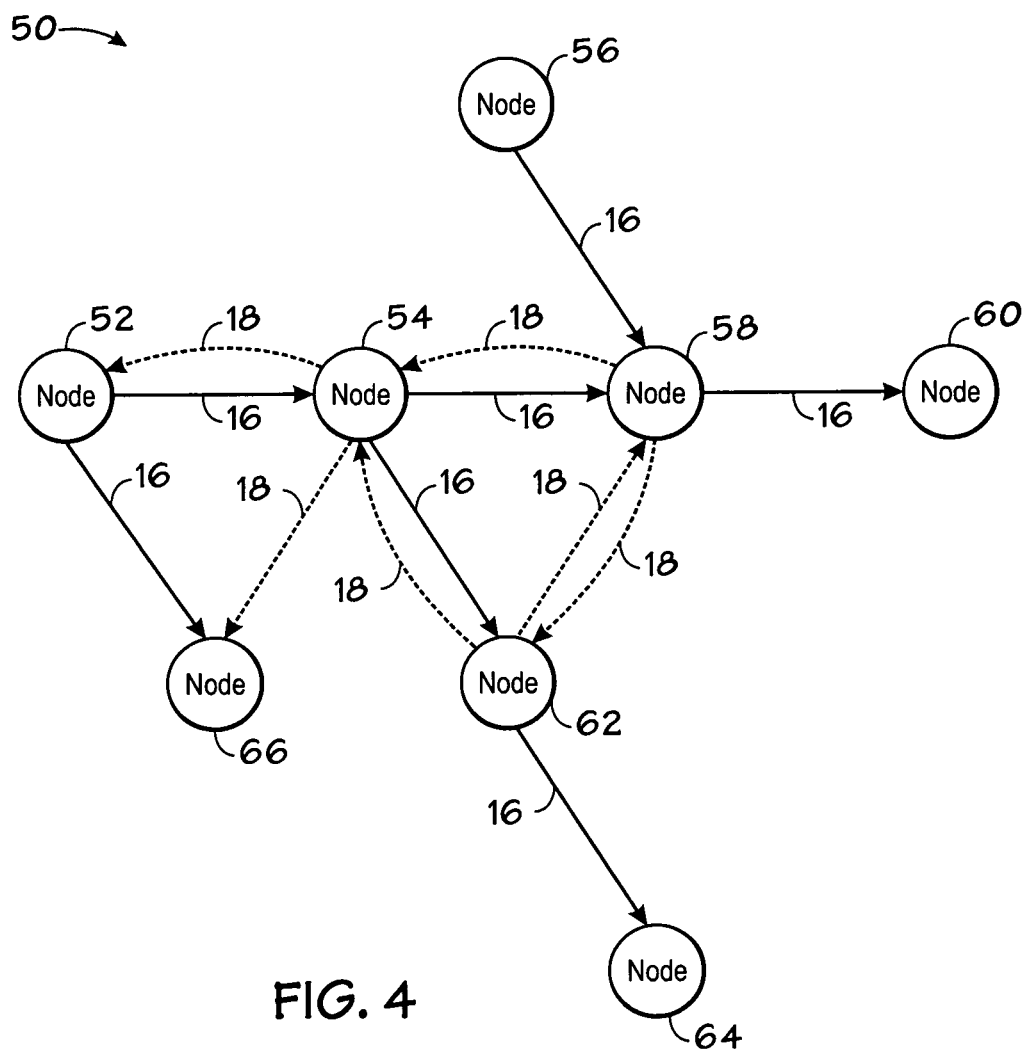
FIG. 4 illustrates a more generalized embodiment of the local contention neighborhood depicted in FIG. 1 in accordance with one embodiment.

While the technique 30 was described in regard to the local contention neighborhood 10, the technique may also be applied to a more generalized local contention neighborhood, such as the local contention neighborhood 50 illustrated in FIG. 4. It will be appreciated that the neighborhood 50 is a more generalized embodiment than the neighborhood 10 indicated in FIG. 1. For simplicity, however, like reference numerals have been used to designate those elements previously described in regard to FIG. 1. Unlike FIG. 1, which depicted a plurality of nodes in communication with access points 12a-12c configured to receive transmissions from the nodes 14a-g, FIG. 4 depicts a plurality of more generalized nodes 52, 54, 56, 58, 60, 62, 64, and 66 (hereafter referred to as "52-66") that communicate wirelessly with one another. Those nodes 52-66 that communicate with one another are connected by data connections 16, and those nodes that interfere with one another are depicted by interference effects 18. For example, the node 54 communicates with the nodes 58 and 62 and interferes with the nodes 52 and 66.

As with the local contention neighborhood 10, it is desirable to compute access attempt probabilities for each of the nodes 52-66 such that the overall throughput within the neighborhood 50 is increased and/or maximized. One technique for computing the access attempt percentages for the nodes 52-66 is to employ the technique 30 previously discussed in regard to FIG. 2. For example, if the node 54 wants to calculate an access attempt percentage for a communication to the node 62, it may first calculate its queue length and dynamic weight using Equations 1 and 2, described above. After calculating its dynamic weight, the node 54 may calculate an access attempt percentage by dividing its dynamic weight by the total dynamic weight of all those nodes 52-66 communicating with the nodes with which node 54 interferes (this total weight includes the weight of node 54 itself). In one embodiment, the node 54 receives a list of the nodes with which it interferes from signals transmitted by the nodes 54-66 with which it interferes. In this case, a transmission from the node 54 may interfere with nodes 52, 58, 62, and 66. Further, transmissions from the node 54 also may interfere with a possible simultaneous reception of a transmission by the node 54 itself. As such, to calculate the access attempt percentage for node 54, node 54 would use Equation 4 described above. More specifically, the node 54 would calculate its access attempt percentage by dividing its dynamic weight by the its dynamic weight plus the dynamic weight of the nodes 52, 58, 62, and 66. As with the neighborhood 10, this calculation is possible because each of the nodes 52-66 is configured to transmit its dynamic weight to some or all of the other nodes 52-66 to enable this calculation.

While the invention may be susceptible to various modifications and alternative forms, specific embodiments have been shown by way of example in the drawings and have been described in detail herein. However, it should be understood that the invention is not intended to be limited to the particular forms disclosed Rather, the invention is to cover all modifications, equivalents, and alternatives falling within the spirit and scope of the invention as defined by the following appended claims.

We claim:

1. A system comprising:

a plurality of network nodes of a local contention neighborhood of a random access network, wherein a first node is configured to transmit to a second node at an access attempt percentage, wherein the first node is configured to receive an indicia of inter-node interference between the first node and a third node and a measurement of transmission success rate of the third node, wherein the first node is configured to adjust the access attempt percentage to transmit to the second node based on the measurement of transmission success rate of the third node, wherein the first node is configured to adjust the access attempt percentage based on an indicia of transmission success rate of the first node divided by the measurement of transmission success rate of the third node.

2. A system comprising:

a plurality of network nodes of a local contention neighborhood of a random access network, wherein a first node is configured to transmit to a second node at an access attempt percentage, wherein the first node is configured to receive an indicia of inter-node interference between the first node and a third node and a measurement of transmission success rate of the third node, wherein the first node is configured to adjust the access attempt percentage to transmit to the second node based on the measurement of transmission success rate of the third node, wherein the second node comprises a wireless local area network access point.

3. A system comprising:

a plurality of network nodes of a local contention neighborhood of a random access network, wherein a first node is configured to transmit to a second node at an access attempt percentage, wherein the first node is configured to receive an indicia of inter-node interference between the first node and a third node and a measurement of transmission success rate of the third node, wherein the first node is configured to adjust the access attempt percentage to transmit to the second node based on the measurement of transmission success rate of the third node, wherein the first node is configured to receive an indicia of inter-node interference with a fourth node and a measurement of transmission success rate of the fourth node, wherein the first node is configured to adjust the access attempt percentage based on a measurement of transmission success rate of the first node divided by a sum of the measurement of transmission success rate of the third node and the measurement of transmission success rate of the fourth node.

\* \* \* \* \*